(12) United States Patent
Stringham (10) Patent No.: US 8,065,272 B2
(45) Date of Patent: Nov. 22, 2011

(54) SYSTEMS AND METHODS FOR TRACKING CHANGES TO A VOLUME

(75) Inventor: Russell R. Stringham, Ogden, UT (US)

(73) Assignee: Symantec Corporation, Mountain View, CA (US)

( * ) Notice: Subject to any disclaimer, the term of this patent is extended or adjusted under 35 U.S.C. 154(b) by 518 days.

(21) Appl. No.: 12/164,458

(22) Filed: Jun. 30, 2008

(65) Prior Publication Data

US 2009/0300080 A1    Dec. 3, 2009

Related U.S. Application Data

(66) Substitute for application No. 12/130,641, filed on May 30, 2008, now abandoned.

(51) Int. Cl.
*G06F 17/30* (2006.01)
(52) U.S. Cl. ........................................ 707/644; 707/649
(58) Field of Classification Search ................... 707/649, 707/640, 646, 999.202, 999.204, 999.205, 707/644; 711/162
See application file for complete search history.

(56) References Cited

U.S. PATENT DOCUMENTS

| 6,085,298 | A | 7/2000 | Ohran |
| 6,269,381 | B1 | 7/2001 | St. Pierre et al. |
| 7,568,080 | B2 * | 7/2009 | Prahlad et al. ................. 711/162 |
| 2005/0289381 | A1 | 12/2005 | Yeo |
| 2006/0075294 | A1 | 4/2006 | Ma et al. |
| 2006/0080362 | A1 * | 4/2006 | Wagner et al. ................ 707/200 |
| 2008/0140963 | A1 | 6/2008 | Thomason et al. |

FOREIGN PATENT DOCUMENTS

GB    2306022    4/1997

OTHER PUBLICATIONS

Search Report and Written Opinion Received in related International Application No. PCT/US2009/047494, Aug. 1, 1996.

* cited by examiner

*Primary Examiner* — Charles Rones
*Assistant Examiner* — Fariborz Khoshnoodi
(74) *Attorney, Agent, or Firm* — Advantedge Law Group (57) ABSTRACT

A computer-implemented method for tracking changes to a volume is disclosed. The method may comprise: 1) identifying a first snapshot of a volume, 2) identifying a window within which the first snapshot was created, the window beginning with a first point known to have occurred before the first snapshot and ending with a second point known to have occurred after the first snapshot, 3) identifying at least one change to the volume that occurred within the window, and 4) associating the at least one change that occurred within the window with both the first snapshot and a second snapshot created after the first snapshot. Corresponding systems and computer-readable media are also disclosed.

12 Claims, 7 Drawing Sheets

SYSTEMS AND METHODS FOR TRACKING CHANGES TO A VOLUME

BACKGROUND

Some conventional methods for backing up data may involve creating a backup based on a snapshot of one or more volumes of a computing system. For example, a conventional, volume-based backup program may create a base (or full) backup of a volume based on an initial snapshot of the volume. When blocks of the volume change, the conventional, volume-based backup program may create an incremental backup of the volume (as opposed to an additional full backup) by: 1) taking a new snapshot, 2) identifying each block (e.g., each sector or cluster) of the volume that has changed since the last snapshot, and then 3) capturing each of the changed blocks.

In some situations, developers of a backup program may wish to integrate their program with one or more third-party snapshot providers in order to leverage specialized features or advantages offered by the third-party snapshot provider. For example, developers of a software-based backup program may wish to utilize and support snapshots provided by hardware-based and off-host snapshot providers in order to take advantage of the performance benefits offered by hardware-based and off-host snapshots.

Unfortunately, conventional backup programs may be unable to utilize or fully support third-party snapshots since conventional backup programs are typically unable to identify the exact point when a third-party snapshot is created. For example, because many third-party snapshot providers (such as hardware-based and off-host snapshot providers) do not track or identify the blocks of a volume that have changed since the creation of a prior snapshot, conventional backup programs are typically unable to create incremental backups from third-party snapshots. As such, conventional volume-based backup programs may only be able to utilize and support creating full backups (as opposed to incremental backups) from snapshots provided by third-party snapshot providers.

SUMMARY

As will be described in greater detail below, the instant disclosure generally relates to systems and methods for tracking changes to a volume. In one example, such systems and methods may enable a backup program to support snapshots created by third-party snapshot providers. For example, as will be described in greater detail below, the instant disclosure may enable a software-based backup program to create incremental backups from hardware-based snapshots.

In one example, a method for tracking changes to a volume may comprise: 1) identifying a first snapshot of a volume (created, for example, by a third-party snapshot program), 2) identifying a window within which the first snapshot was created, 3) identifying each block of the volume that changed within the window, and then 4) adding a reference to each block of the volume that changed within the window to both a first list associated with the first snapshot and a second list associated with a second snapshot created after the first snapshot.

In one example, the window may begin with a first point known to have occurred before the first snapshot was created (i.e., a point in time that definitely occurred before creation of the first snapshot) and end with a second point known to have occurred after the first snapshot was created (i.e., a point in time that definitely occurred after creation of the first snapshot). References to block changes that occur prior to the beginning of the window may be added to the first list associated with the first snapshot, while references to block changes that occur after the end of the window may be added to the second list associated with the second snapshot. In certain examples, the first and second lists associated with the first and second snapshots may be used to create full or incremental backups of the volume.

Systems and computer-readable media corresponding to the above-described methods are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for tracking changes to a volume. In one example, such systems and methods may enable a backup program to support snapshots created by third-party snapshot providers. For example, as will be described in greater detail below, the instant disclosure may enable a software-based backup program to create incremental backups from hardware-based snapshots.

Figure 1:
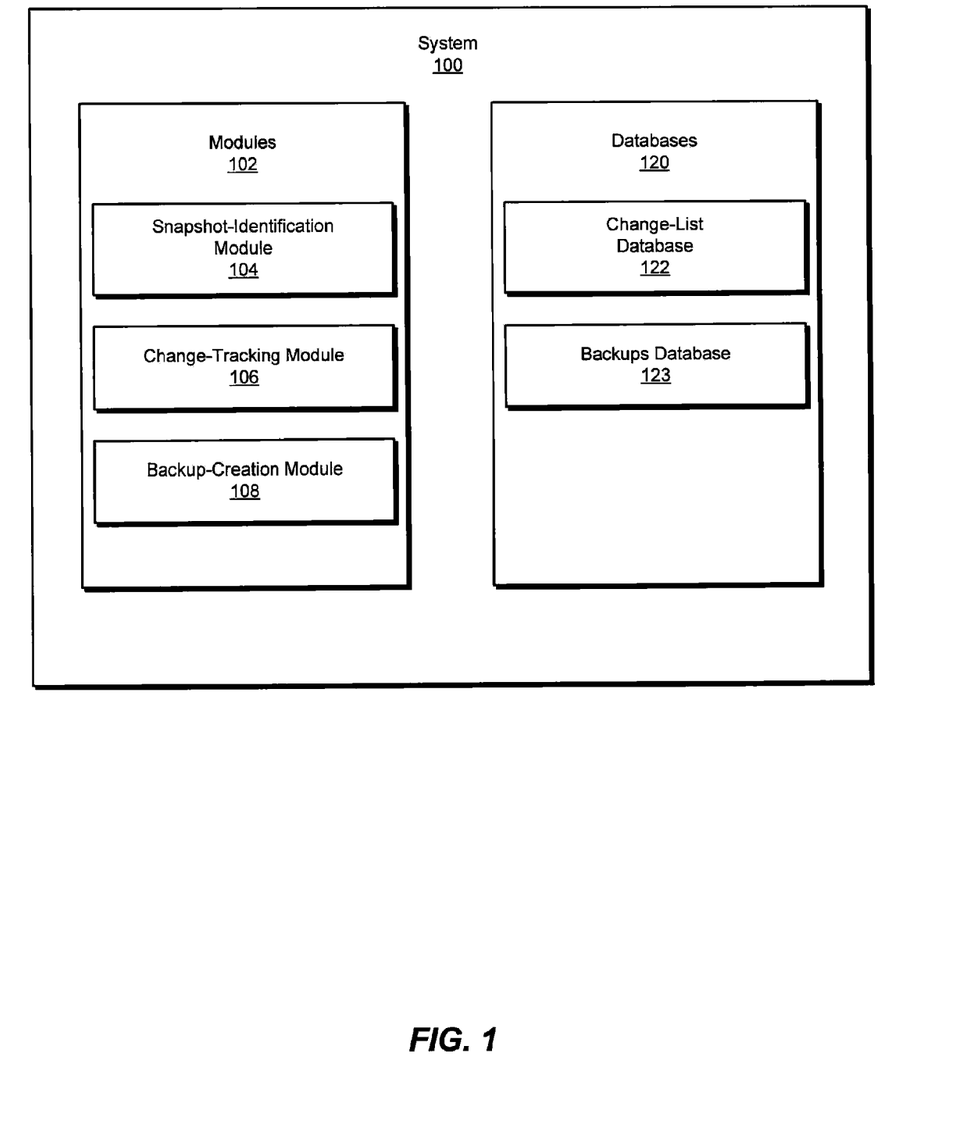
FIG. 1 is a block diagram of an exemplary system for tracking changes to a volume according to at least one embodiment.
Figure 2:
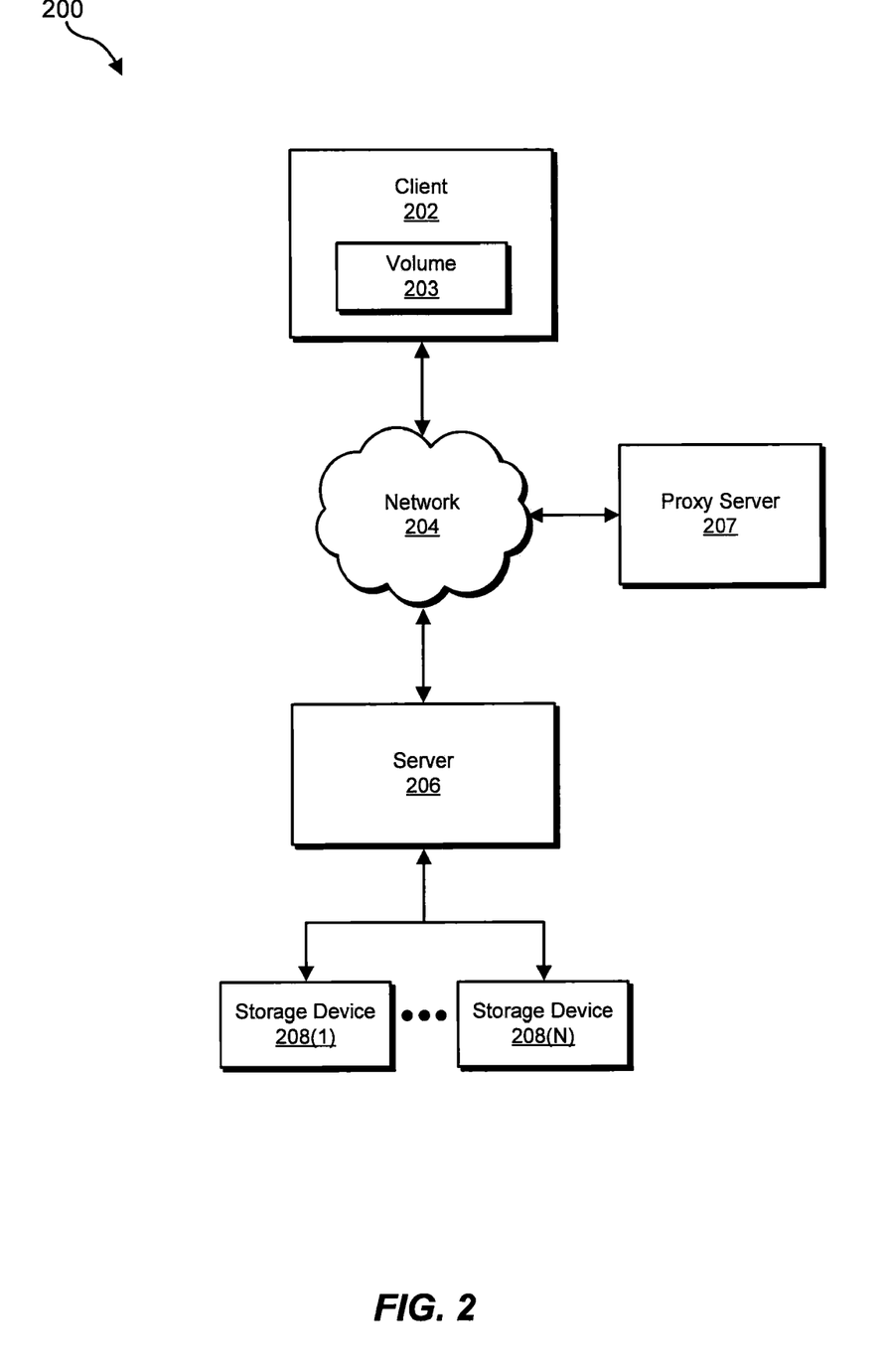
FIG. 2 is a block diagram of an exemplary networked environment for tracking changes to a volume according to at least one embodiment.
Figure 3:
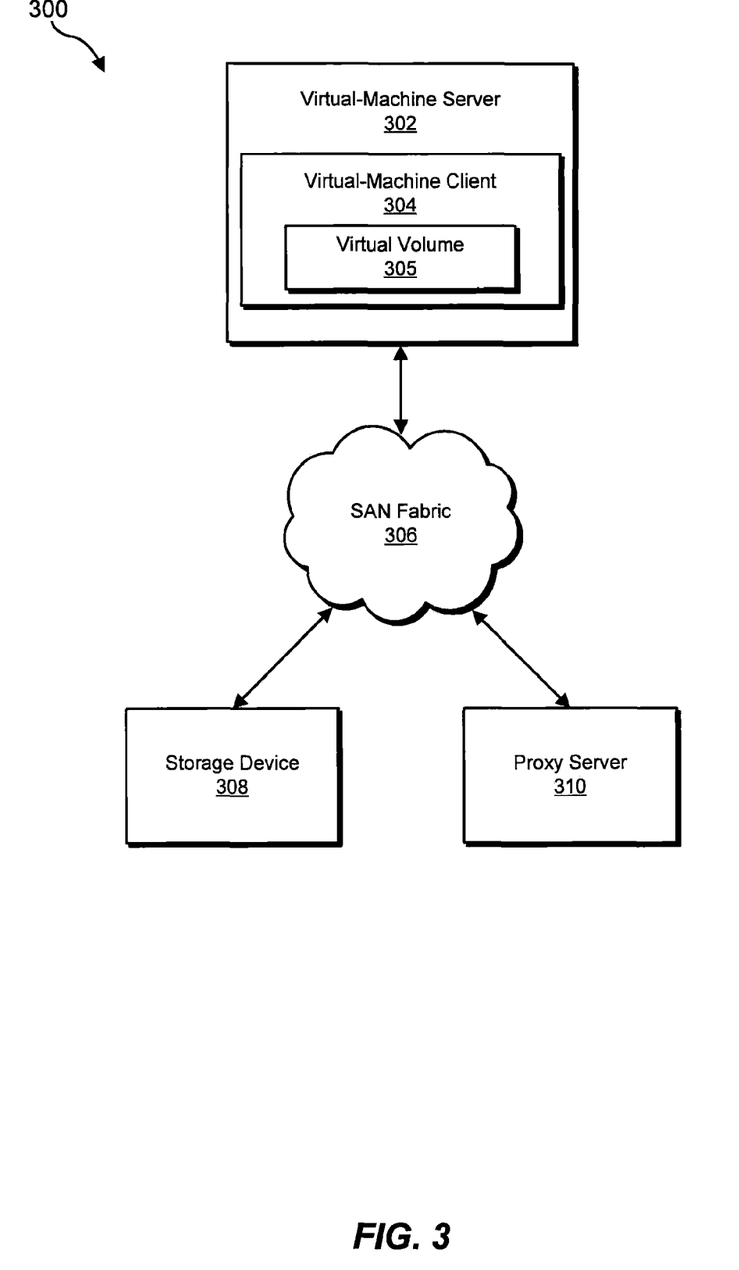
FIG. 3 is a block diagram of an exemplary virtual environment for tracking changes to a volume according to an additional embodiment.

The following will provide, with reference to FIGS. 1-3, detailed descriptions of exemplary systems for tracking changes to a volume. A description of a timing diagram for tracking changes to a volume will also be provided in connection with FIG. 5. A description of corresponding exemplary computer-implemented methods will also be provided in connection with FIGS. 4 and 6. In addition, a description of an exemplary computing system capable of implementing one or more of the embodiments described and illustrated herein will be provided in connection with FIG. 7.

FIG. 1 is a block diagram of an exemplary system 100 for tracking changes to a volume. The term "volume," as used herein, generally refers to any type or form of physical, logical, or virtualized volume of a computing system. As illustrated in FIG. 1, exemplary system 100 may comprise one or more modules 102 for performing one or more tasks. For example, exemplary system 100 may comprise a snapshot-identification module 104 for identifying snapshots of a volume (which, in some situations, may be created by a third-party snapshot provider).

Exemplary system 100 may also comprise a change-tracking module 106 for tracking changes to a volume, as will be explained in greater detail below. In addition, exemplary system 100 may comprise a backup-creation module 108 for creating a backup of a computing system (in some cases, based on third-party snapshots). The term "backup," as used herein, may refer to any type or form of backup of at least a portion of a file, a program, or volume of a computing system. In addition, the term "snapshot," as used herein, generally refers to a point-in-time copy of data. In certain examples, a snapshot may serve as a guide for creating a backup of a computing device.

As illustrated in FIG. 1, exemplary system 100 may also comprise one or more databases 120. For example, exemplary system 100 may comprise a change-list database 122 for storing lists that identify changes made to a volume ("change lists"). Exemplary system 100 may also comprise a backups database 123 for storing backups for one or more computing systems. Although illustrated as separate devices, one or more of databases 120 in FIG. 1 may represent portions of a single database or a single computing device.

In certain embodiments, one or more of modules 102 may represent one or more software applications or programs that, when executed by a computing device, may cause the computing device to perform one or more tasks required to track changes made to a volume. For example, as will be described in greater detail below, one or more of modules 102 may represent software modules configured to run on one or more computing devices, such as the computing devices illustrated in FIG. 2 (e.g., client 202, server 206, and storage devices 208(1)-(N)), FIG. 3 (e.g., virtual-machine server 302, virtual-machine client 304, virtual volume 305, storage device 308, and proxy server 310), and FIG. 7 (e.g., computing system 710). One or more of modules 102 may also represent all or a portion of one or more special-purpose computers configured to perform one or more tasks required to track changes to a volume.

In addition, one or more of databases 120 in FIG. 1 may represent a portion of one or more computing devices. For example, one or more of databases 120 may represent a portion of the exemplary computing systems illustrated in FIGS. 2, 3, and 7. Alternatively, one or more of databases 120 may represent one or more physically separate devices capable of being accessed by a computing device, such as the exemplary computing devices illustrated in FIGS. 2, 3, and 7.

Figure 4:
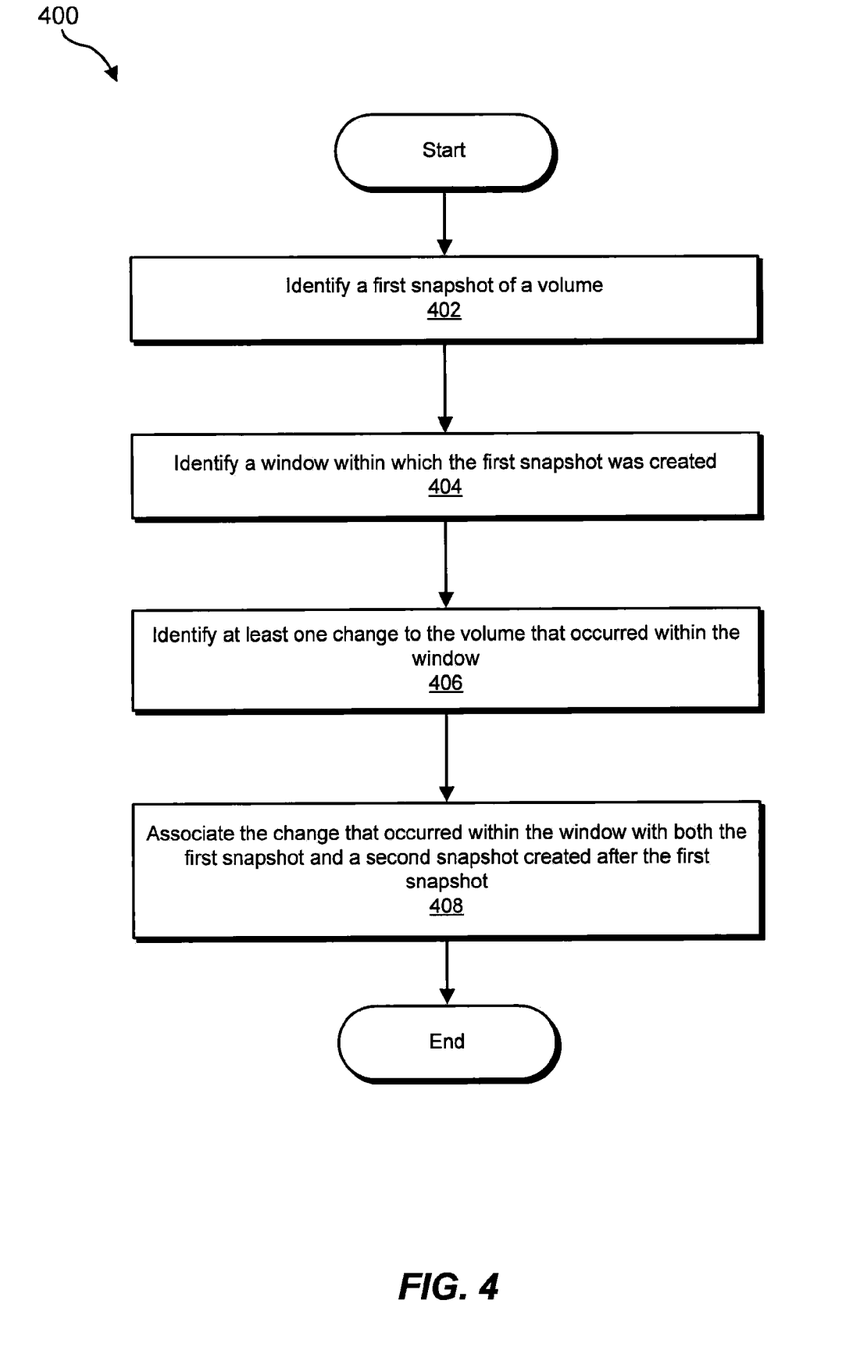
FIG. 4 is a flow diagram of an exemplary computer-implemented method for tracking changes to a volume in accordance with at least one embodiment.

FIG. 4 is a flow diagram of an exemplary computer-implemented method 400 for tracking changes to a volume. As illustrated in this figure, at step 402 a first snapshot of a volume may be identified. For example, snapshot-identification module 104 in FIG. 1 may determine that a third-party snapshot provider has created a snapshot.

At step 404, the system may identify a window within which the first snapshot identified in step 402 was created. In one example, this window may begin with a first point known to have occurred before the first snapshot identified in step 402 was created (i.e., a point in time that definitely occurred before creation of the first snapshot) and end with a second point known to have occurred after the first snapshot was created (i.e., a point in time that definitely occurred after creation of the first snapshot).

Figure 5:
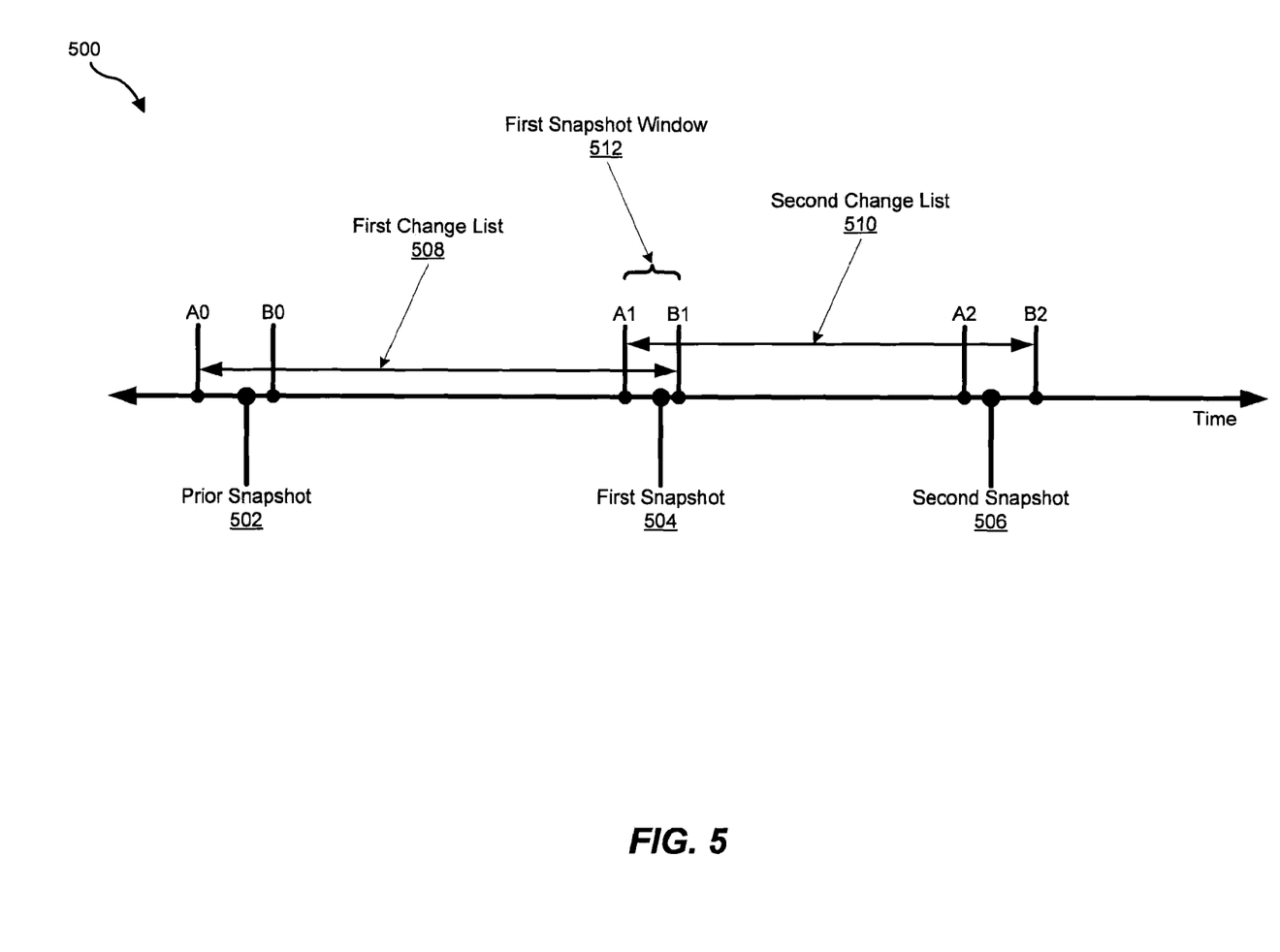
FIG. 5 is an exemplary timing diagram for tracking changes to a volume according to one embodiment.

FIG. 5 is an illustration of a timing diagram for identifying a window within which a snapshot of a volume was created. As illustrated in this figure, a first snapshot window 512 for a first snapshot 504 may be identified by identifying a first point A1 known to have occurred before the creation of first snapshot 504 and a second point B1 known to have occurred after the creation of first snapshot 504. Returning to FIG. 4, at step 406, the system may identify at least one change to the volume that occurred within the window. For example, change-tracking module 106 may identify each block of the volume that changed within first snapshot window 512 in FIG. 5. As used herein, the term "block" may refer to the lowest level of addressable space in a volume. In additional examples, the blocks identified by change-tracking module 106 may be sectors, files, portions of files, clusters, portions of clusters, or the like of a volume that changed within the window.

At step 408, the system may associate the change identified in 406 with both the first snapshot and a second snapshot created after the first snapshot. For example, change-tracking module 106 in FIG. 1 may associate all changes that occurred within first snapshot window 512 in FIG. 5 with both first snapshot 504 and second snapshot 506. In certain examples, such an association may represent a logical association only since the snapshots (which may be provided by a third-party snapshot provider) may have no way of knowing about such an association.

Step 408 in FIG. 4 may be performed in a variety of ways. For example, step 408 may comprise adding a reference to each block of the volume that changed within the window identified in step 404 to both the first snapshot and the second snapshot. In an alternative embodiment, step 408 may comprise adding a reference to each block of the volume that changed within the window identified in step 404 to both a first change list associated with the first snapshot and a second change list associated with the second snapshot.

For example, change-tracking module 106 may add a reference to each block of the volume that changed within first snapshot window 512 to both first change list 508 associated with first snapshot 504 and second change list 510 associated with second snapshot 506. As detailed above, the phrase "change list," as used herein, may refer to a list that identifies changes made to a volume since a prior snapshot. Change lists may identify changes to a volume in a variety of ways. For example, a change list may represent a sorted list of indices for blocks in a volume that have changed. In an additional example, a change list may represent a bitmap that comprises one bit for each block in a volume. Initially, all bits in the bitmap may be logical zeros (0). However, when a change to a block is identified, a bit corresponding to each changed block may be set to a logical one (1).

Thus, in at least one embodiment, change lists 508 and 510 may identify blocks on a volume that have changed since a prior snapshot. In certain examples, change lists 508 and 510 may be used to create an incremental backup of a volume. Upon completion of step 408 in FIG. 4, exemplary method 400 in FIG. 4 may terminate.

Figure 6:
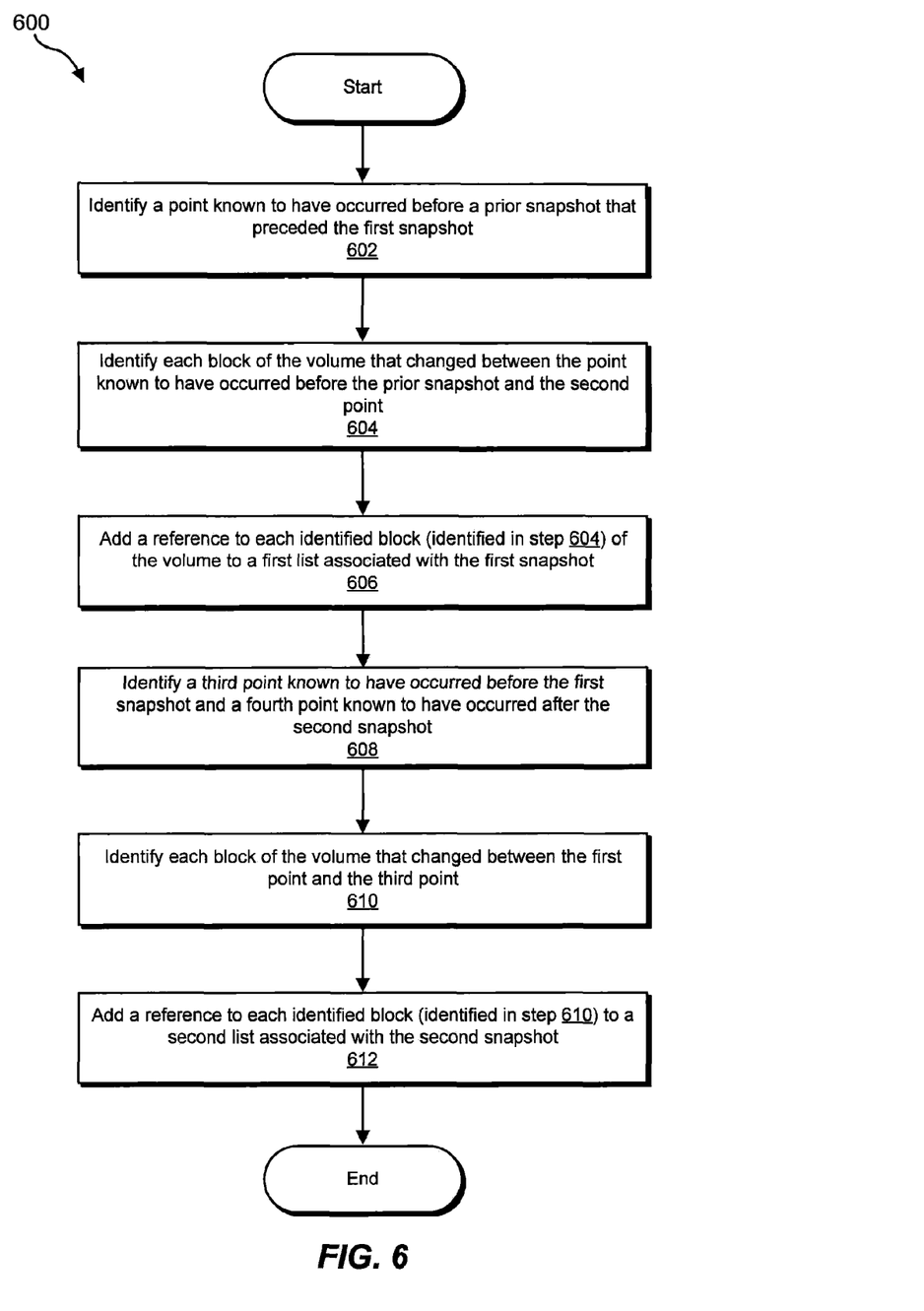
FIG. 6 is a flow diagram of an exemplary computer-implemented method for creating lists for snapshots that identify changes made to a volume in accordance with at least one embodiment.

As detailed above, change lists 508 and 510 in FIG. 5 may identify changes to a volume since a prior snapshot of the volume. FIG. 6 is a flow diagram of an exemplary computer-implemented method 600 for creating change lists for a volume. In at least one embodiment, step 602 may begin upon completion of step 408 in FIG. 4. As illustrated in FIG. 6, at step 602 the system may identify a point known to have occurred before a prior snapshot that preceded a first snapshot was created (i.e., a point in time that definitely occurred before creation of the prior snapshot). For example, change-tracking module 106 in FIG. 1 may identify a point A0 in FIG. 5 known to have occurred before a prior snapshot 502, which was created before first snapshot 504.

At step 604, the system may identify each block of a volume that changed between point A0 (i.e., the point known to have occurred before prior snapshot 502 in FIG. 5) and point B1 (i.e., a point known to have occurred after first snapshot 504).

At step 606, the system may add a reference to each block of the volume that changed between point A0 and point B1 to first change list 508 associated with first snapshot 504.

At step 608, the system may identify a third point known to have occurred before first snapshot 504 and a fourth point known to have occurred after second snapshot 506 (i.e., a point in time that definitely occurred after creation of second snapshot 506). For example, change-tracking module 106 in FIG. 1 may identify a point A1 as the third point known to have occurred prior to first snapshot 504 and B2 as the fourth point known to have occurred after second snapshot 506 in FIG. 5.

At step 610, the system may identify each block of the volume that changed between point A1 and point B2 in FIG. 5. At step 612, a reference to each block of the volume that changed between point A1 and point B2 may be added to a second change list 510 associated with second snapshot 506. As detailed above, in certain examples change lists 508 and 510 may be used to create an incremental snapshot or backup of a volume. Upon completion of step 612 in FIG. 6, exemplary method 600 may terminate.

As detailed above, the exemplary systems and methods described herein may enable a backup program to support third-party snapshots, even if the backup program is unable to identify the exact point when a third-party snapshot is created. For example, the exemplary systems and methods described herein may enable developers of a software-based backup program to utilize and support snapshots provided by hardware-based and off-host snapshot providers in order to take advantage of the performance benefits offered by hardware-based and off-host snapshots.

Moreover, due to the speed of modern computing systems, the window within which a third-party snapshot is created may be reduced to a very small period of time. As such, the number of blocks on a volume that change within this window may be relatively small. Regardless, even if blocks that did not actually change since the prior snapshot are unnecessarily added to an incremental backup, these additional blocks in no way affect the validity of the resulting backup, since each block of the volume that changed since the most-recent snapshot is still included in the backup.

The exemplary systems and methods described herein may be utilized in a variety of ways. For example, all or a portion of exemplary system 100 in FIG. 1 may represent portions of a networked system, such as exemplary networked system 200 in FIG. 2, capable of creating hardware-based snapshots. As illustrated in this figure, exemplary system 200 may comprise a client 202 in communication with a server 206 and a proxy server 207 via a network 204.

Client 202 generally represents any type or form of client-side computing device capable of executing computer-readable instructions. In certain examples, client 202 may comprise a volume 203. Volume 203 generally represents any type or form of storage device or medium capable of storing data and/or computer-readable instructions. Examples of volume 203 include, without limitation, physical volumes, logical volumes, and virtual volumes. In certain embodiments, client 202 may comprise one or more portions of exemplary system 100 in FIG. 1. For example, one or more of modules 102 in FIG. 1 may be stored and configured to run on client 202. Similarly, one or more of databases 120 in FIG. 1 may represent portions of client 202 in FIG. 2.

In at least one embodiment, client 202 may communicate with server 206 and proxy server 207 via network 204. Network 204 generally represents any type or form of communication or computing network; including, for example, an intranet, a wide area network (WAN), a local area network (LAN), a personal area network (PAN), or the Internet.

Server 206 generally represents any type or form of server-side computing device. In certain embodiments, server 206 may represent a SAN device configured to create and store hardware snapshots of volume 203 of client 202. In certain embodiments, server 206 may comprise one or more portions of exemplary system 100 in FIG. 1. For example, one or more of modules 102 in FIG. 1 may be stored and configured to run on server 206. Similarly, server 206 may comprise one or more of databases 120 in FIG. 1.

Proxy server 207 generally represents any type or form of server-side computing device. In certain embodiments, proxy server 207 may access hardware snapshots of volume 203 created by and stored on server 206. In this example, proxy server 207 may create backups of volume 203 based on the hardware snapshots of volume 203 provided by server 206.

As illustrated in FIG. 2, exemplary system 200 may also comprise one or more storage devices 208(1)-(N). Storage devices 208(1)-(N) generally represent any type or form of storage device or medium capable of storing data and/or other computer-readable instructions. In certain embodiments, storage devices 208(1)-(N) may store snapshots or backups of a volume of a computing system, such as volume 203 of client 202.

As detailed above, the exemplary systems and methods described herein may enable a software-based backup program to create incremental backups from hardware-based snapshots. For example, with reference to exemplary method 400 in FIG. 4, at step 402 in FIG. 4 snapshot-identification module 104 in FIG. 1 may identify a first hardware snapshot of volume 203 in FIG. 2. In certain embodiments, this first hardware snapshot of volume 203 may be stored on storage devices 208(1)-(N).

At step 404 in FIG. 4, change-tracking module 106 in FIG. 1 may identify a window within which the first hardware snapshot of volume 203 (identified in step 402) was created. For example, change-tracking module 106 may identify a first point known to have occurred before the first hardware snapshot identified in step 402 was created (i.e., a point in time that definitely occurred before creation of the first hardware snapshot) and a second point known to have occurred after the first hardware snapshot was created (i.e., a point in time that definitely occurred after creation of the first hardware snapshot).

At step 406 in FIG. 4, change-tracking module 106 in FIG. 1 may identify at least one change to volume 203 in FIG. 2 by identifying each block of volume 203 that changed within the window identified in step 404. At step 408, change-tracking module 106 in FIG. 1 may add a reference to each block of volume 203 in FIG. 2 that changed within the window to both a first change list associated with the first hardware snapshot and a second change list associated with a second hardware snapshot created after the first hardware snapshot. In at least one example, backup-creation module 108 in FIG. 1 may create, using these first and second change lists, incremental backups of volume 203.

In an additional example, all or a portion of exemplary system 100 in FIG. 1 may represent portions of a virtual environment, such as exemplary virtual environment 300 in FIG. 3, capable of creating off-host snapshots. As illustrated in this figure, virtual environment 300 may comprise a virtual-machine server 302, virtual-machine client 304, SAN fabric 306, a storage device 308, and a proxy server 310. Virtual-machine server 302 generally represents any type or form of device capable of serving or providing access to one or more virtual-machine clients, such as virtual-machine client 304. In certain embodiments, virtual-machine server 302 may represent a single server partitioned into multiple virtual machines by abstracting processor, memory, storage, and networking resources. Examples of virtual-machine server 302 include, without limitation, VMWARE ESX, MICROSOFT HYPERV, or the like.

As illustrated in FIG. 3, virtual-machine server 302 may comprise at least one virtual-machine client 304. Virtual-machine client 304 generally represents any type or form of virtual-machine environment. In certain embodiments, virtual-machine client 304 may comprise a virtual volume 305. Volume 305 generally represents any type or form of virtual storage for storing data and/or computer-readable instructions. Examples of virtual volume 305 include, without limitation, logical volumes and virtual volumes.

As illustrated in FIG. 3, virtual-machine server 302 may be in communication with SAN fabric 306. SAN fabric 306 generally represents any type or form of computer network or architecture capable of facilitating communication between a plurality of storage devices. In the example illustrated in FIG. 3, SAN fabric 306 may facilitate communication between virtual-machine server 302, storage device 308, and/or proxy server 310. In one example, SAN fabric 306 may enable virtual-machine server 302 and proxy server 310 to mount and access storage device 308.

As with storage devices 208(1)-(N) in FIG. 2, storage device 308 generally represents any type or form of storage device or medium capable of storing data and/or computer-readable instructions. In one example, storage device 308 may store virtual volume 305 of virtual-machine client 304. Proxy server 310 in FIG. 3 generally represents any type or form of proxy server capable of accessing the snapshot maintained on the storage device 308 by virtual-machine server 302. An example of proxy server 310 includes, without limitation, VMWARE's VIRTUAL CONSOLIDATED BACKUP (VCB).

In certain embodiments, one or more of modules 102 from FIG. 1 may be stored and configured to run on one or more portions of virtual environment 300. For example, one or more of modules 102 may be stored and configured to run on virtual-machine server 302, virtual-machine client 304, storage device 308, and/or proxy server 310. Similarly, virtual-machine server 302, virtual-machine client 304, virtual volume 305, storage device 308, and/or proxy server 310 may comprise one or more of databases 120 in FIG. 1.

In this example, (and potentially in the example illustrated in FIG. 2), modules 102 may enable a software-based backup program to support off-host incremental backups (i.e., backups created on a different computing system than the one being backed up via snapshots created of a volume on the machine being backed up and accessible to the machine performing the backup). For example, with reference to exemplary method 400 in FIG. 4, at step 402 snapshot-identification module 104 in FIG. 1 may identify a first off-host snapshot of virtual volume 305 of virtual-machine client 304 in FIG. 3 stored on storage device 308.

At step 404, change-tracking module 106 in FIG. 1 may identify a window within which the first off-host snapshot of virtual volume 305 of virtual-machine client 304 (identified in step 402) was created. For example, change-tracking module 106 may identify a first point known to have occurred before the first off-host snapshot identified in step 402 was created (i.e., a point in time that definitely occurred before creation of the first off-host snapshot) and a second point known to have occurred after the first off-host snapshot was created (i.e., a point in time that definitely occurred after creation of the first off-host snapshot).

This window may be identified in a variety of ways. For example, change-tracking module 106 may identify this window by monitoring communications in the driver stack on virtual-machine client 304 and/or by utilizing pre- and post-snapshot scripts utilized by virtual-machine client 304 to quiesce data, as known in the art.

At step 406, change-tracking module 106 in FIG. 1 may identify each change to virtual volume 305 of virtual-machine client 304 in FIG. 3 that occurred within the window identified in step 404. At step 408, change-tracking module 106 in FIG. 1 may add a reference to each change that occurred to virtual volume 305 of virtual-machine client 304 within the window to both a first change list associated with the first off-host snapshot and a second change list associated with a second off-host snapshot created after the first off-host snapshot. In certain embodiments, these lists may be sent to proxy server 310 using pre- and post-snapshot scripts utilized by virtual-machine client 304. In at least one example, backup-creation module 108 in FIG. 1 may create, using these first and second change lists, incremental backups of virtual volume 305 of virtual-machine client 304.

Figure 7:
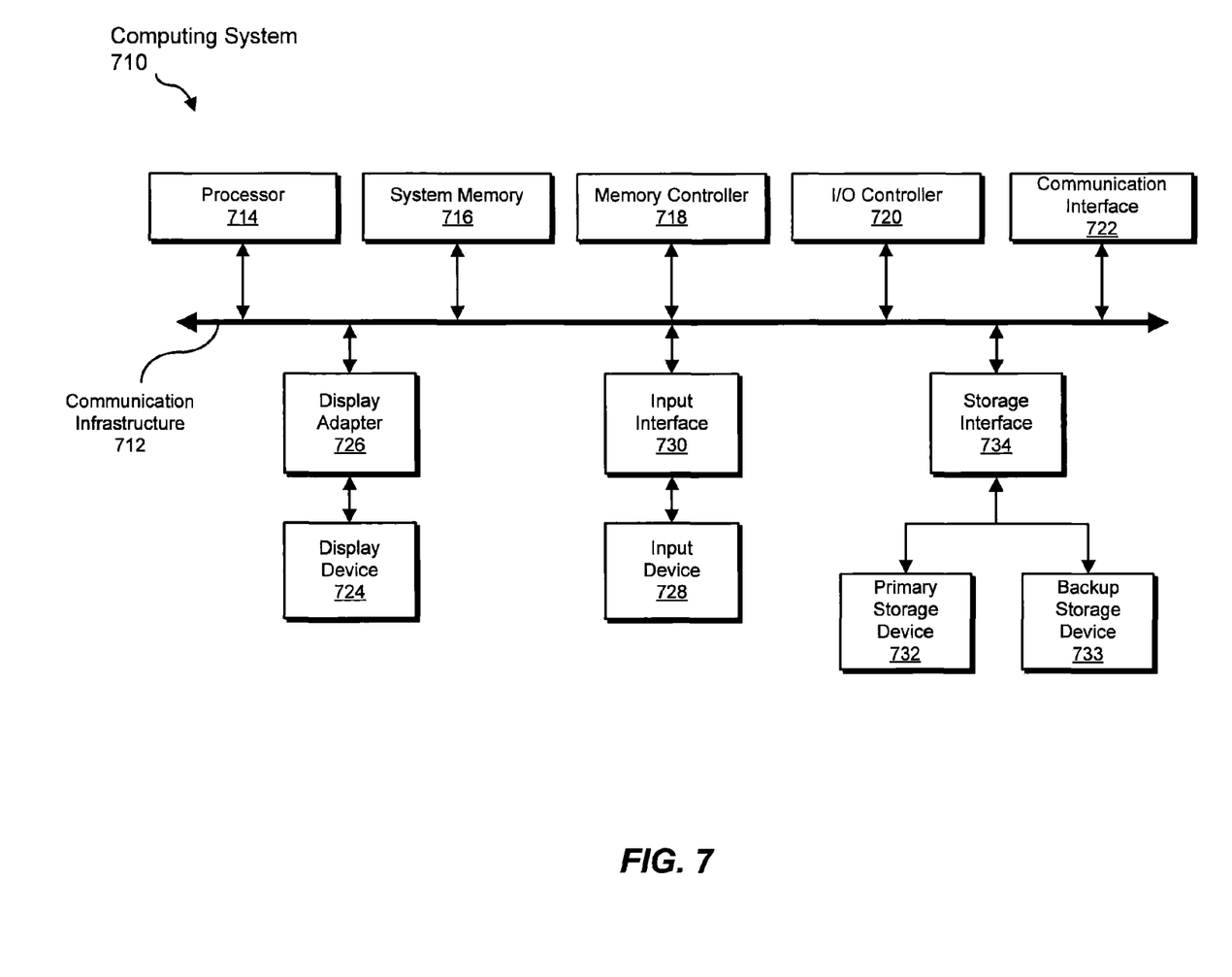
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, associating, adding, and creating steps described herein. Processor 714 may also perform and/or or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, associating, adding, and/or creating.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing the identifying, associating, adding, and creating steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network or a wireless IEEE 802.11 network), a personal area network (such as a BLUETOOTH or IEEE 802.15 network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, associating, adding, and creating steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, associating, adding, and creating steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Storage devices 732 and 733 may also be used, for example, to perform and/or be a means for performing, either alone or in combination with other elements, one or more of the identifying, associating, adding, and creating steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

As detailed above, computing system 710 may perform and/or be a means for performing, either alone or in combination with other elements, one or more steps of the exemplary methods described and/or illustrated herein. For example, a computer-implemented method for tracking changes made to a volume may comprise identifying a first snapshot of the volume. The first snapshot may comprise a software and/or a hardware snapshot. The method may also comprise identifying a window within which the first snapshot was created. The window may begin with a first point known to have occurred before the first snapshot and end with a second point known to have occurred after the first snapshot.

The method may further comprise identifying at least one change to the volume that occurred within the window and associating such changes that occurred within the window with both the first snapshot and a second snapshot. The second snapshot may be created after the first snapshot. In certain embodiments, identifying at least one change to the volume may comprise identifying each block of the volume that changed within the window.

In certain embodiments, the method may further comprise: 1) identifying a point known to have occurred before a prior snapshot that preceded the first snapshot, 2) identifying each block of the volume that changed between the point known to have occurred before the prior snapshot and the second point, and then 3) adding a reference to each block of the volume that changed between the point known to have occurred before the prior snapshot and the second point to a first list associated with the first snapshot. Using the prior snapshot, a full backup of the volume may then be created. Similarly, a first incremental backup of the volume may be created using the first list.

In some embodiments, the method may further comprise identifying a third point known to have occurred after the second snapshot and identifying each block of the volume that changed between the first and third points. A reference to each block of the volume that changed between the first and third points may then be added to a second list associated with the second snapshot. The mentioned process of adding references to changed blocks to corresponding lists may comprise creating the first and second lists.

In at least one embodiment, upon associating the at least one change that occurred within the window with both the first and second snapshots, the method may comprise adding a reference to each block of the volume that changed within the window to both the first and second lists. In other embodiments, a first incremental backup of the volume may be created using the first list. Likewise, a second incremental backup of the volume may be created using the second list.

In additional embodiments, a system for tracking changes to a volume in a networked environment may comprise at least one client comprising at least one volume. A server may communicate with the client. The server may also comprise a change-tracking module configured to identify a window within which a first snapshot of the volume was created. The window may begin with a first point known to have occurred before the first snapshot and end with a second point known to have occurred after the first snapshot.

The change-tracking module may also be configured to identify at least one change to the volume that occurred within the window and associate the at least one change that occurred within the window with both the first snapshot and a second snapshot. The second snapshot may be created after the first snapshot.

In some embodiments, the change-tracking module may be configured to identify a point known to have occurred before a prior snapshot that preceded the first snapshot. The change-tracking module may also be configured to identify each block of the volume that changed between the point known to have occurred before the prior snapshot and the second point. In certain embodiments, the change-tracking module may be further configured to add a reference to each block of the volume that changed between the point known to have occurred before the prior snapshot and the second point to a first list. The first list may be associated with the first snapshot.

In other embodiments, the change-tracking module may be configured to identify a third point known to have occurred after the second snapshot. The change-tracking module may be further configured to identify each block of the volume that changed between the first and third points. A reference to each block of the volume that changed between the first and third points may be added to a second list. The second list may be associated with the second snapshot. The change-tracking module may associate the at least one change that occurred within the window with both the first and second snapshots. Said association may comprise adding a reference to each block of the volume that changed within the window to both the first and second lists.

In various embodiments, the change-tracking module may comprise a backup-creation module. The backup-creation module may be configured to create a full backup of the volume using the prior snapshot. The backup-creation module may also be configured to create a first incremental backup of the volume using the first list and/or the first snapshot.

In additional embodiments, a system for tracking changes to a volume in a virtual environment may comprise a virtual-machine server comprising at least one virtual-machine client. The system may also comprise a storage area network in communication with the virtual-machine server. Furthermore, the system may comprise a change-tracking module configured to identify a window within which a first snapshot of the virtual-machine client was created. Said window may begin with a first point known to have occurred before the first snapshot and end with a second point known to have occurred after the first snapshot.

The change-tracking module may be further configured to identify at least one change to the virtual-machine client that occurred within the window and associate the at least one change with both the first and second snapshots. The second snapshot may be created after the first snapshot.

In at least one embodiment, the change-tracking module may be configured to: 1) identify a point that occurred before a prior snapshot that preceded the first snapshot, 2) identify each change to the virtual-machine client that occurred between the point known to have occurred before the prior snapshot and the second point, and 3) add references to said changes to a first list associated with the first snapshot.

In certain embodiments, the change-tracking module may comprise a proxy server in communication with the storage network. The proxy server in communication with the storage network may further comprise a backup-creation module. The backup-creation module may be configured to create a full backup of the virtual-machine client using the prior snapshot. The backup-creation module may be further configured to create a first incremental backup of the virtual-machine client using the first list.

In some embodiments, the change-tracking module may be configured to identify a third point known to have occurred after the second snapshot. The change-tracking module may also be configured to identify each change to the virtual-machine client that occurred between the first and third points. A reference to each change to the virtual-machine client that occurred between the first and third points may be added to a second list associated with the second snapshot. Furthermore, the change-tracking module may associate the at least one change that occurred within the window with both the first and second snapshots. Said association may comprise adding a reference to each change that occurred to the virtual-machine client within the window to both the first and second lists.

While the foregoing disclosure sets forth various embodiments using specific block diagrams, timing diagrams, flowcharts, and examples, each diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for tracking changes made to a volume, the method comprising:
    identifying a first snapshot of the volume;
    identifying a window within which the first snapshot was created, the window beginning with a first point known to have occurred before the first snapshot and ending with a second point known to have occurred after the first snapshot;
    identifying each block of the volume that occurred changed within the window;
    associating each said block of the volume that changed within the window with both the first snapshot and a second snapshot created after the first snapshot by adding a reference to each said block of the volume that changed within the window to both a first list associated with the first snapshot and a second list associated with the second snapshot.

2. The method of claim 1 further comprising:
    identifying a point known to have occurred before a prior snapshot that preceded the first snapshot;

identifying each said block of the volume that changed between the point known to have occurred before the prior snapshot and the second point;

adding a reference to each said block of the volume that changed between the point known to have occurred before the prior snapshot and the second point to the first list associated with the first snapshot.

3. The method of claim 2, further comprising:

creating, using the prior snapshot, a full backup of the volume;

creating, using at least one of the first list and the first snapshot, a first incremental backup of the volume.

4. The method of claim 2, further comprising:

identifying a third point known to have occurred after the second snapshot;

identifying each said block of the volume that changed between the first point and the third point;

adding a reference to each block of the volume that changed between the first point and the third point to the second list associated with the second snapshot.

5. The method of claim 1, further comprising:

creating the first list;

creating the second list.

6. The method of claim 4, further comprising:

creating, using at least one of the first list and the first snapshot, a first incremental backup of the volume;

creating, using at least one of the second list and the second snapshot, a second incremental backup of the volume.

7. The method of claim 1, wherein the first snapshot comprises:

a software snapshot;

a hardware snapshot.

8. A system for tracking changes to a volume in a networked environment, the system comprising:

at least one client comprising at least one volume;

a server in communication with the client;

a change-tracking module on the server, the change-tracking module configured to:

identify a window within which a first snapshot of the volume was created, the window beginning with a first point known to have occurred before the first snapshot and ending with a second point known to have occurred after the first snapshot;

identify each block of the volume that changed within the window;

associate each said block of the volume that changed within the window with both the first snapshot and a second snapshot created after the first snapshot by adding a reference to each said block of the volume that changed within the window to both a first list associated with the first snapshot and a second list associated with the second snapshot.

9. The system of claim 8, wherein the change-tracking module is further configured to:

identify a point known to have occurred before a prior snapshot that preceded the first snapshot;

identify each said block of the volume that changed between the point known to have occurred before the prior snapshot and the second point;

add a reference to each said block of the volume that changed between the point known to have occurred before the prior snapshot and the second point to the first list associated with the first snapshot.

10. The system of claim 9, further comprising a backup-creation module configured to:

create, using the prior snapshot, a full backup of the volume;

create, using at least one of the first list and the first snapshot, a first incremental backup of the volume.

11. The system of claim 9, wherein the change-tracking module is further configured to:

identify a third point known to have occurred after the second snapshot;

identify each said block of the volume that changed between the first point and the third point;

add a reference to each said block of the volume that changed between the first point and the third point to the second list associated with the second snapshot.

12. The system of claim 11, further comprising a backup-creation module configured to:

create, using at least one of the first list and the first snapshot, a first incremental backup of the volume;

create, using at least one of the second list and the second snapshot, a second incremental backup of the volume.

* * * * *